Figure 1:
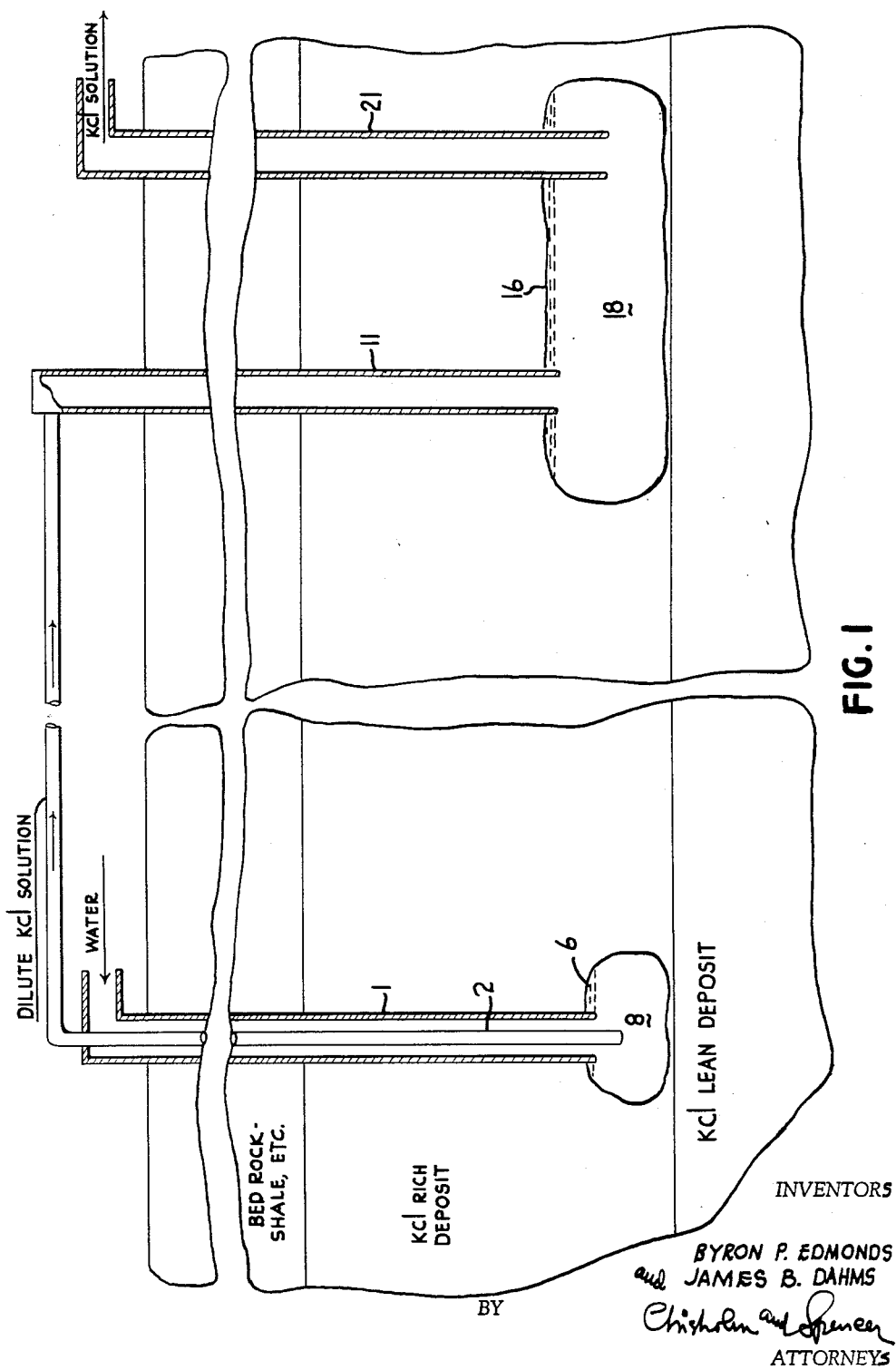

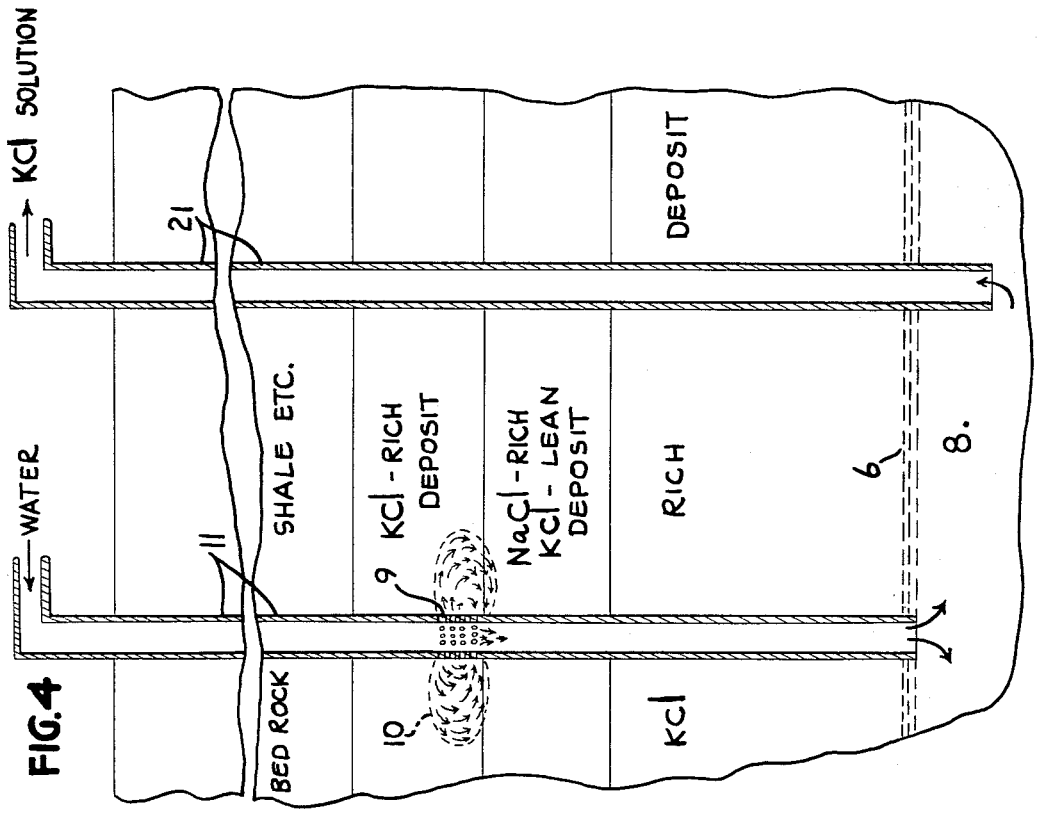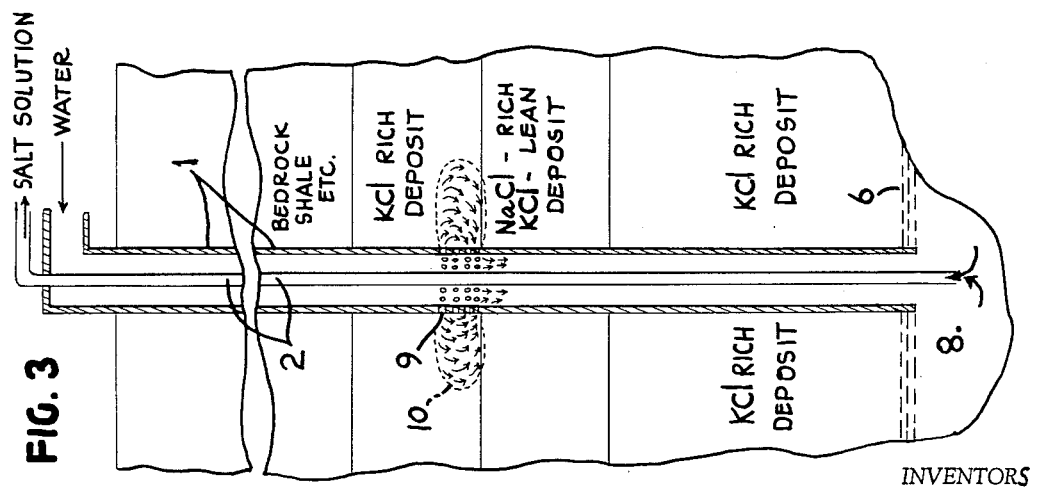

INVENTORS
BYRON P. EDMONDS
JAMES B. DAHMS
BY Chisholm and Spencer
ATTORNEYS

United States Patent Office 3,262,741
Patented July 26, 1966

3,262,741
SOLUTION MINING OF POTASSIUM CHLORIDE
Byron Priestly Edmonds, Regina, Saskatchewan, Canada, and James Bowen Dahms, New Martinsville, W. Va., assignors to Pittsburgh Plate Glass Company, Pittsburgh, Pa., a corporation of Pennsylvania
Filed Apr. 1, 1965, Ser. No. 444,661
15 Claims. (Cl. 299—4)

This application is a continuation-in-part of commonly assigned and now abandoned applications United States Serial No. 176,327, filed February 28, 1962, and United States Serial No. 277,853, filed May 3, 1963, which is a continuation-in-part of said United States application Serial No. 176,327.

This invention relates to a novel method of mining potassium chloride deposits. It more particularly relates to the mining of potassium chloride from subterranean deposits by dissolving potassium chloride therefrom in water to form an aqueous solution.

Potassium chloride usually occurs in mineral deposits closely associated with sodium chloride. Often, potassium chloride exists in admixture or in combination with sodium chloride in the form of a potassium chloride-rich stratum (containing 15 to 60 percent potassium chloride based on the total weight of potassium chloride and sodium chloride in the stratum) or a plurality of such deposits which are disposed immediately above and below other strata which are lean as to potassium chloride (containing less than 15 percent thereof by weight) or which contain no substantial amount of potassium chloride and are preponderantly sodium chloride. These deposits normally contain varying amounts of other minerals, such as clay, calcium sulphate and magnesium sulphate.

The aforedescribed deposits of potassium chloride and sodium chloride are frequently located very deep. For example, Canadian deposits of this character typically occur 3,000 feet or more below the surface of the ground.

Some potassium chloride has been produced from naturally occurring aqueous solutions. However, substantially all of the potassium chloride recovered from underground is obtained by shaft, room and pillar type mining in which the potassium chloride-containing material is removed in solid state from the deposit and carried to the surface where it is treated by special techniques to separate potassium chloride.

A number of proposals have been made for the recovery of potassium chloride by extraction by solution mining methods with a solvent such as water or unsaturated aqueous soltuions. Apparently, none of these proposals has achieved commercial success; the literature does not report a commercially successful venture.

In order to obtain a commercially attractive rate of recovery of potassium chloride from a subterranean deposit, a cavity of substantial proportions must ordinarily be developed therein so that the solvent circulating through the deposit will come into contact with a substantial surface rich in potassium chloride. The development of such a cavity has heretofore been a major economic problem because of the expenditure of time, solvent, and potassium chloride product attendant to the initial stages of its development.

The invention described in United States Patent 3,096,969 provides one method of establishing a suitable cavity in a potassium chloride-rich subterranean deposit. In the practice of the process of the invention therein disclosed, a hole is drilled through a potassium chloride-rich deposit and downwardly into the zone in which the potassium chloride concentration is low (below 15 percent by weight) or is substantially non-existent and where the sodium chloride content is relatively high. Solvent, i.e., water which is unsaturated as to sodium chloride, is caused to flow down the hole either through the casing of the hole or through a pipe concentrically positioned within the casing and the potassium chloride-lean, sodium chloride-rich stratum is extracted by solution to establish a cavity in the manner well known to the art of extracting sodium chloride from subterranean deposits. Extraction of the potassium chloride-rich deposit is effected by raising the roof of the cavity thus formed in the potassium chloride-lean stratum into the ptoassium chloride-rich stratum.

Commercially attractive rates of recovery of potassium chloride cannot normally be maintained from an established cavity after it has attained certain dimensions. The actual magnitudes of these dimensions depend on several factors which may vary from cavity to cavity, e.g., the possibility of roof collapse, the thickness of the stratum being mined, the circulation path which exists within the cavity and the shape of the cavity. When a cavity can no longer yield a commercially attractive rate of recovery of potassium chloride, it usually is abandoned in favor of developing a new cavity.

It is not generally practicable to develop a new cavity without recourse to special techniques. Where the stratum immediately below the potassium chloride-rich stratum is primarily sodium chloride or other water soluble material, one recommended technique involves first extracting by solution the salt or other water soluble material from this underlying stratum, thereby developing a sizable cavity, and then raising the roof of the cavity up into the mineable stratum in the manner disclosed in the said Patent No. 3,096,969. A large quantity of water is used in forming such a cavity and the aqueous solution withdrawn therefrom usually is discarded as waste. Any potassium chloride in this solution is therefore lost.

This invention provides an efficient method for the development of new cavities for the recovery of potassium chloride from a subterranean potassium chloride-rich deposit whereby a suitable cavity is formed directly in the potassium chloride-rich deposit. This invention also provides an economical method whereby a commercially attractive rate of recovery is maintained in an established cavity even after it has attained such dimensions as to preclude the commercial recovery of potassium chloride under operating techniques practiced heretofore. In addition, this invention provides a method whereby the potassium chloride values in the unsaturated aqueous solution producing during the initial development of a new cavity can be effectively salvaged.

In the practice of the process herein contemplated, a hole is drilled down into a deposit (stratum or strata) containing sodium chloride but rich in potassium chloride (containing about 15 to about 60 percent potassium chloride by weight based on the weight of potassium chloride and sodium chloride in the deposit). Water (including unsaturated aqueous solutions of one or both of these salts) is caused to flow down the hole, either through the casing of the hole or through a pipe concentrically positioned within the casing. The water is introduced into the potassium chloride-rich deposit, preferably close to the bottom thereof, and the deposit is extracted by forming an unsaturated aqueous solution of potassium chloride and/or sodium chloride thereby developing the cavity.

The solution produced in this fashion normally ranges from 25, rarely less than 20, to 75, rarely more than 85 percent saturated with respect to the salt which more nearly saturates the solution. "Percent saturated," as that term is used herein and in the claims, is based on the weight of the respective salts which can be dissolved from the ore of the deposit in question in water at the temperature of the aqueous solution in the cavity. The temperature of the solution is actually measured at the surface of the earth rather than in the cavity. However, when the solution is withdrawn at a rapid rate and care is taken to prevent heat transfer either to or from the ascending solution, the temperature of the solution at the surface of the earth may be considered to approximate the temperature of the solution in the cavity.

Typically, unsaturated solution produced by a new cavity while it is being developed is considered too unsaturated to be directly processed economically for recovery of potassium chloride. Rather than being discharged as waste, however, this unsaturated solution is forwarded to an existing established cavity large enough or otherwise suitable to increase the potassium chloride concentration of the solution. The cavity undergoing formation is developed until it reaches sufficient proportions, typically at least 25 feet in diameter, to make it economical to obtain directly therefrom adequately concentrated (substantially saturated) aqueous solution.

The existing established cavity which receives the unsaturated solution may be one which has grown to such dimensions that it is no longer feasible to maintain a commercial rate of recovery of potassium chloride therefrom by use of typical (unsupplemented) feeds. In that event, use of unsaturated potassium chloride solution obtained from the first cavity for feed to the second cavity or as a supplement to the feed for that cavity usually improves significantly the performance of the second cavity. In this manner an old or over-developed cavity can continue to be mined economically.

It is sometimes economically advantageous to feed the dilute solution to a cavity which is capable of producing a commercial rate of recovery of potassium chloride with typical (unsupplemented) feeds. Thus, the potassium chloride contained in the dilute solution is salvaged, as is the water being used for the development of the new cavity. In addition, the residence time of the solvent in the second cavity is reduced by this procedure.

In a typical embodiment hereof, water, unsaturated with respect to sodium chloride and potassium chloride, is initially fed to and subsequently recovered from an undeveloped potassium chloride-rich deposit at a rate such that the withdrawn solution is unsaturated. Thus the residence time in the undeveloped deposit is relatively short. Through this procedure, a cavity of growing proportions is created in the deposit until ultimately it becomes sufficiently large so that the residence time for producing a saturated solution or a nearly saturated solution is economically attractive.

During the development of this new cavity the dilute solution is forwarded to an existing, established cavity wherein its potassium chloride (and sodium chloride) content is raised to adequate strength. Typically, the solution which is withdrawn from a developed cavity and from which potassium chloride is to be separated ranges from about 90 to about 98 percent saturated, on the aforestated basis, with respect to the salt which more nearly saturates the solution.

According to a further embodiment of this invention, the water is fed to the lower portion of an undeveloped potassium chloride-rich stratum and aqueous solution is withdrawn at a rate which far exceeds that necessary for obtaining a saturated or near saturated solution. Thus, the new cavity is developed at an accelerated rate because the rate of solution of the deposit bears an inverse relationship to the concentration of the aqueous solvent.

It usually is desirable to control the direction of development of a new cavity. Thus, for example, if it is desired to interconnect the new cavity with another new cavity or an existing established cavity, the new cavity is developed in a horizontal direction until it interconnects with the other cavity.

Thus, according to a preferred embodiment of this invention, a plurality of new cavities are developed horizontally until they communicate with each other. Water is then fed down at least one bore hole, potassium chloride is dissolved from the deposit and aqueous solution is withdrawn through at least one of the other bore holes communicating with the interconnected pair or group of cavities. When a plurality of new cavities interconnect, the resulting cavity is usually of sufficient size to support independently a commercial rate of extraction of potassium chloride.

The cavity may also be developed in a vertical direction by raising its roof.

An ideal method for accomplishing this control over the growth of the cavity is to introduce into the cavity, along with the water, an inert fluid which can be a gas but is preferably a liquid such as oil, refined or non-refined petroleum, or similar hydrocarbon, which is mutually insoluble with water and has a density lower than that of water at the solution temperature prevailing in the cavity. A protective layer of the inert fluid is thereby caused to locate at the top of the cavity and the development of the cavity is controlled in accordance with the method described in Patent No. 3,096,969, the disclosure of which is hereby incorporated by reference to the extent that it is applicable hereto.

Figure 2:
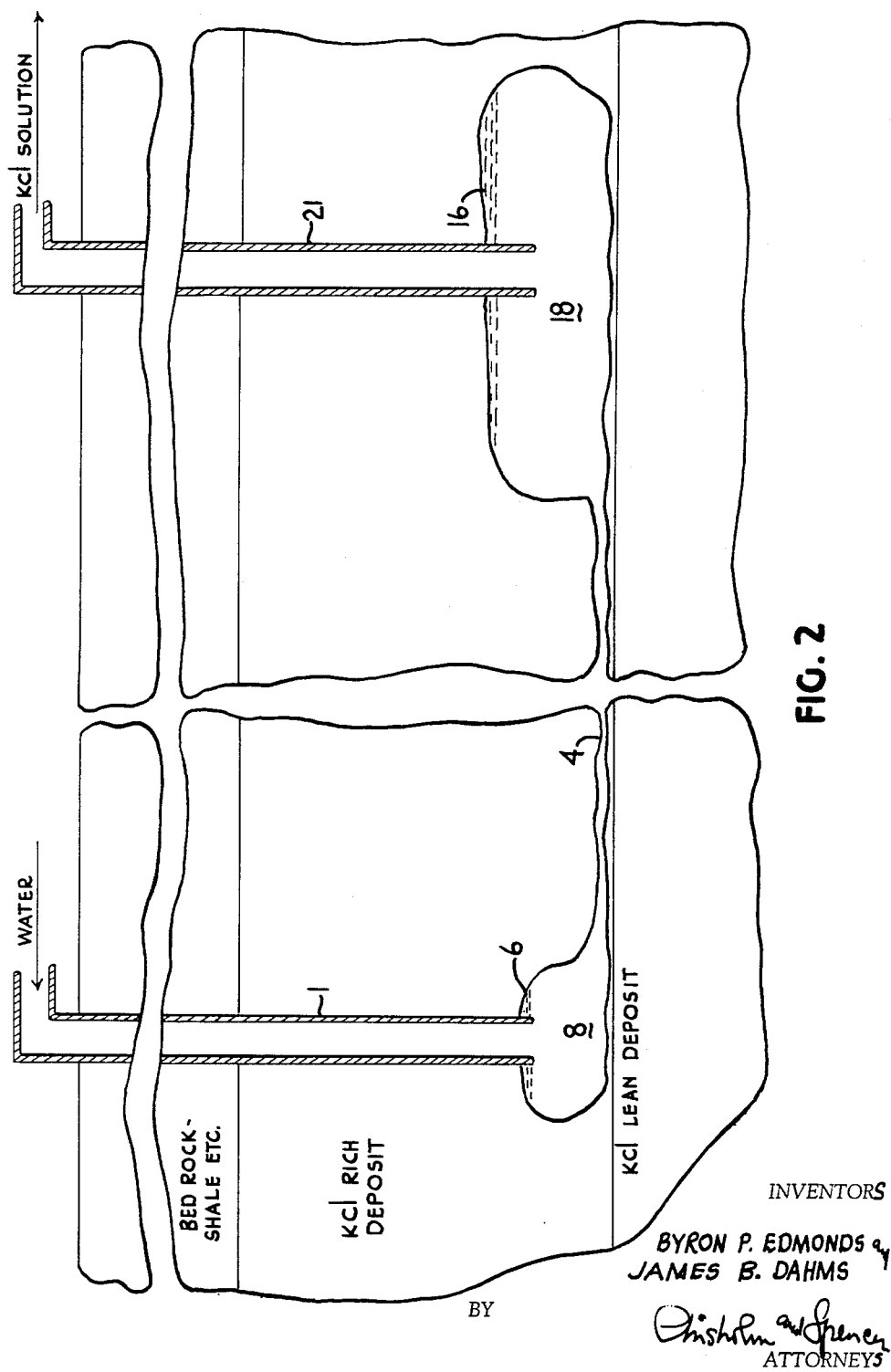
Figure 6:
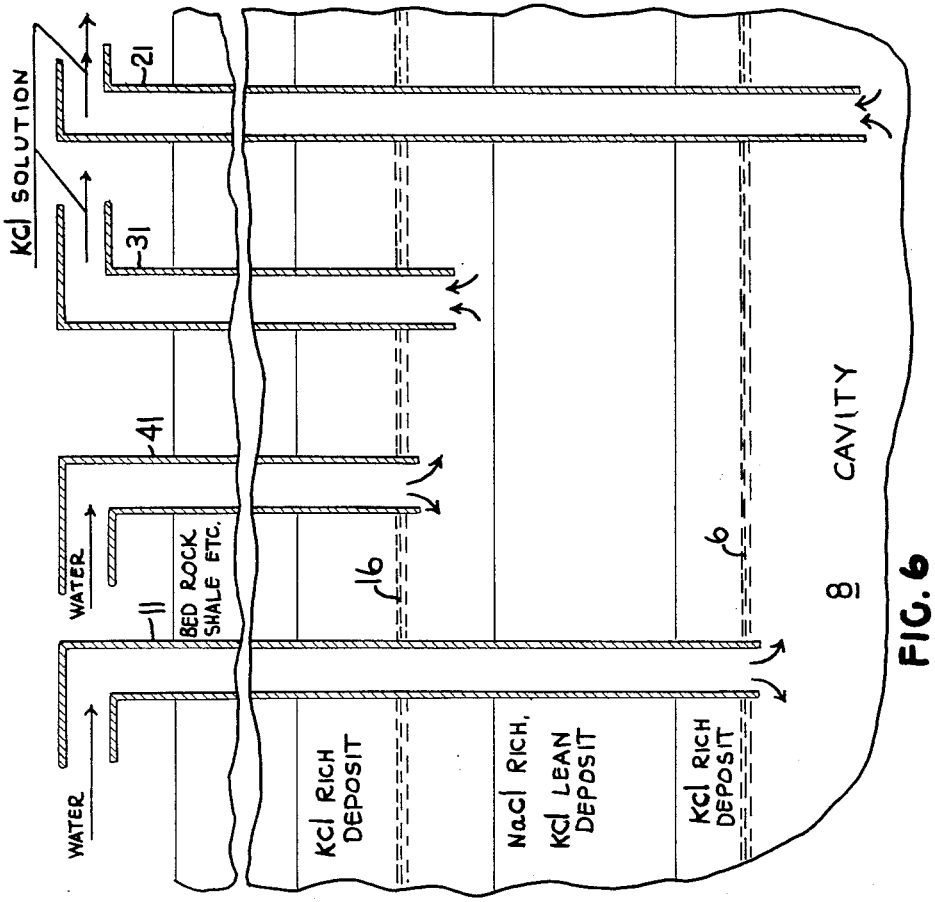
Figure 5:
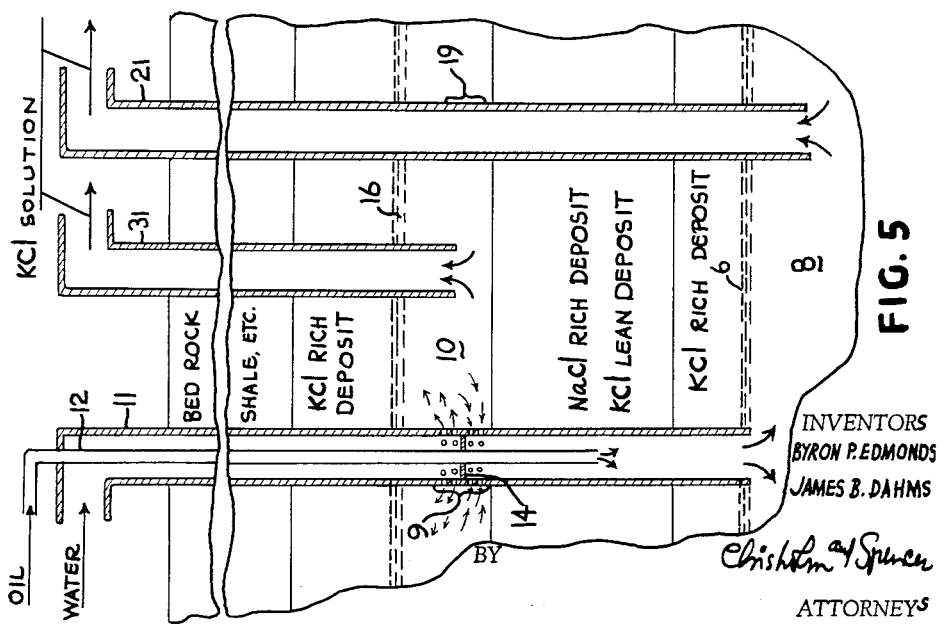

The accompanying drawings illustrate typical embodiments of this invention. FIGURE 1 illustrates a preferred embodiment wherein dilute solution is withdrawn from a developing cavity to the surface of the earth and then forwarded as feed to an existing cavity. FIGURE 2 illustrates an alternative embodiment wherein dilute solution is forwarded from a developing cavity to an existing cavity through a fracture in the formation. FIGURE 3 illustrates an embodiment wherein dilute solution is withdrawn from a developing cavity and forwarded to an existing cavity disposed beneath the developing cavity. FIGURES 4, 5 and 6 illustrate embodiments wherein a plurality of bore holes connect with one or more cavities. Like numbers refer to like features in the several figures.

FIGURE 1 shows a diagrammatic view of a typical new cavity being developed. As illustrated in the drawing, a bore hole suitably fitted with a casing 1 is drilled through the bed rock into the subterranean deposit rich in potassium chloride. A typical potassium chloride-rich deposit is of the following approximate composition:

| | Percent by weight |
|---|---|
| Potassium chloride | 15 to 60 |
| Calcium sulfate | 1 to 5 |
| Water insoluble clay | 1 to 10 |
| Water soluble calcium and magnesium salts, such as $MgCl_2$, $MgSO_4$, and $Ca(HCO_3)_2$ | About 2 |
| Sodium chloride | Remainder |

There is then disposed a pipe 2 concentrically within the casing 1 of the hole. Water is then caused to flow down the hole and an unsaturated aqueous solution of potassium chloride is extracted from the potassium chloride-rich deposit. Solutions containing potassium chloride and sodium chloride in the range of about 20 to about 85 percent saturated, on the aforestated basis, with respect to the salt which more nearly saturates the solution, are desirable in order to develop the new cavity rapidly and prevent clogging of the hole and/or cavity through the formation of crystals.

As illustrated by FIGURE 1, casing 1 is adjusted so that it is located near the lowest part of the potassium chloride-rich deposit. As cavity 8 is formed by the dissolving of the salts from the deposit, it will usually be desirable to control the vertical and horizontal growth of the cavity. Such control is accomplished by the formation of a protective layer 6 of substantially water insoluble, inert fluid at the top of the cavity 8 in accordance with the process disclosed in said Patent No. 3,096,969. The unsaturated solution extracted from cavity 8 may be passed to an established cavity 18 in a variety of ways, depending on local geological conditions and economic considerations. Two alternatives are illustrated in the drawings. Normally, the initial extraction will be as illustrated by FIGURE 1 via a pipe 2 whereby the unsaturated solution will flow through an inlet hole 11 into the established cavity 18. Sometimes it is possible to induce a fracture 4, as illustrated by FIGURE 2, along the interface between the potassium chloride-rich deposit and the potassium chloride-lean deposit directly beneath it. The fracture may be induced in accordance with any known practice such as explosives, hydrostatic pressure or undercutting. The unsaturated solution is then passed from cavity 8 to cavity 18 through fracture 4.

The roof of the fracture will normally rise as solution passes through the fracture, and in some instances, cavity 8 will ultimately merge with cavity 18, allowing the free circulation of aqueous solution throughout the resulting subterranean cavern. Whether or not fracture 4 is developed, the protective layers 6 and 16 at the tops of cavities 8 and 18, respectively, can be utilized to encourage the horizontal growth and ultimate communication of the two cavities.

Typically, the unsaturated solution is withdrawn from cavity 8 from a level below that at which the aqueous solvent is introduced, and often at or near the bottom of cavity 8 but above the level where crystals or insoluble impurities have accumulated to an appreciable degree. Care is generally taken to dissolve both sodium chloride and potassium chloride substantially in the proportions in which they exist in the deposit, thus avoiding a concentration of sodium chloride on the surface of the cavity. If the surface of the cavity is allowed to become relatively rich in sodium chloride the rate of aqueous dissolution of potassium chloride may decrease to an impractical degree. The rate of extraction of these salts is controlled by adjusting the quantities of sodium chloride and potassium chloride introduced in the water.

Cavity 8 will usually eventually obtain sufficient dimensions to independently support a commercial rate of recovery of potassium chloride. When this growth occurs, it will often be commercially advantageous to extract from such a cavity independently until such time as it has grown to a size that no longer yields a commercial rate of recovery. After such overdevelopment, it is often commercially advantageous to utilize the unsaturated potassium chloride solution obtained from other new cavities as feed to this old or overdeveloped cavity.

Sometimes, more unsaturated solution is produced by cavities undergoing development than can economically be utilized as feed to existing developed cavities. At other times, not enough unsaturated solution is produced from the new cavities undergoing development to make it economical to use it as feed. Sometimes, there are no developed cavities suitably located to receive the unsaturated solutions as feed, or the state of development of available developed cavities may be such that it is not economically attractive to feed unsaturated solutions to them. For these and other reasons it is sometimes desirable to collect the unsaturated solution from one or more new cavities and store it above ground.

The unsaturated solution may be treated in a variety of ways while it is above ground. Thus, it may be mixed with water which is either more or less saturated with respect to potassium chloride and/or sodium chloride. It may sometimes be advantageous to add chemicals to the unsaturated brine before feeding it to other cavities. In areas where waste heat is available, it is often economically advantageous to utilize this heat to evaporate some of the water from the unsaturated solution. Waste or other heat may be employed to raise or maintain the temperature of the solution.

Sometimes the unsaturated solution from one or more new cavities is collected in one or more reservoirs or ponds. It is then allowed to become more concentrated through solar evaporation. In this fashion, the solution can economically be brought to concentrations suitable for feed to the recovery operation.

Whether or not the unsaturated solutions are collected and stored, the solutions from a plurality of new cavities may be fed to one developed cavity or the effluent from one new cavity may be fed to a plurality of developed cavities.

The new cavities undergoing development are often located in potassium chloride-rich deposits other than the one in which the existing established well is located.

A hole will sometimes pass through a plurality of potassium chloride-rich deposits vertically separated by a deposit lean in potassium chloride or in which potassium chloride is substantially non-existent. Thus, two or more potassium chloride-rich strata may be mined pursuant to the principles of this invention such that the cavity formed in one such stratum is fed with unsaturated aqueous solution forwarded from another stratum.

This invention provides for concurrent removal of potassium chloride from a plurality of subterranean deposits (stratum or strata) containing large quantities of KCl, each being separated by a sodium chloride-rich deposit (stratum or strata) lean in potassium chloride, i.e., has less than 15 percent by weight of potassium chloride, typically less than 5 percent by weight of KCl, based on the weight of sodium and potassium chloride in the deposit, or separated by other mineral deposits similarly low in KCl content. A casing is fitted in a hole bored through the aforementioned strata. Typically, a cavity is first developed in the lower potassium chloride-rich strata. Water is then caused to flow first through the upper stratum, at sufficient rate that it becomes only partially saturated. The partially saturated solution then flows into the cavity in the lower potassium chloride-rich stratum, where it becomes more nearly saturated with respect to potassium chloride. The thus enriched solution is then withdrawn from the lower cavity.

This invention encompasses sinking a cased bore hole through at least three deposits (stratum or strata), i.e., an upper potassium chloride-containing deposit (stratum or strata), a middle sodium chloride-rich, KCl-lean deposit (stratum or strata) and finally through a lower potassium chloride-rich deposit (stratum or strata), thereby making open connection with this lower deposit (stratum or strata). The hole is provide with an opening in the casing which allows for transfer of an aqueous solution from the well to the upper KCl-containing deposit (stratum or strata), preferably at the interface of the upper potassium chloride-containing deposit (stratum or strata) and the middle sodium chloride-rich deposit (stratum or strata), thereby extracting KCl and forming a cavity in this deposit (stratum or strata). The potassium chloride which is dissolved is thereupon passed from the upper potassium chloride deposit back down through the hole to the lower potassium chloride-rich deposit.

The aqueous solution which is passed to the cased hole should be unsaturated as to potassium chloride when introduced into the upper deposit. The rate at which the solution is introduced to the hole should be sufficient to prevent total saturation of the solution as to potassium chloride on removal of the solution from contact with the upper deposit. In this way, the solution which is rich in salts but not saturated in potassium chloride flows from the upper deposit to the lower deposit where additional potassium chloride is extracted and the solution in the lower deposit is removed either through the same hole or through an adjoining connecting cased bore hole. Preferably, removal is effected by a separate and adjoining connecting hole.

In the embodiment, as illustrated in FIGURE 3, the water is allowed to flow downwardly in the space between pipe 2 and casing 1 and substantially saturated potassium chloride-sodium chloride solution is withdrawn from the lowest part of the cavity as it is formed via pipe 2. As is illustrated in the drawing, casing 1 is adjusted so that it fits at the lowest part of the KCl-rich deposit. As the cavity is formed, an immiscible fluid which has a density lower than that of water and which is insoluble in or immiscible with water (preferably hydrocarbon oil) is fed in small amounts (usually in amounts up to about 10 pounds of such agent per cubic foot of salts withdrawn), into the hole along with the water. As a consequence, this fluid becomes a protective layer 6 at the upper portion of the cavity 8 which is produced.

The amount of such fluid which is introduced should be enough to establish a layer of ½ to 8 inches or more at the top of the cavity in order to protect the roof. This amount can be computed roughly by estimating the approximate volume of the cavity from the number of tons of sodium chloride and potassium chloride which is extracted from the deposit. Usually about .1 to 2 pounds of hydrocarbon oil is fed per cubic foot of salts withdrawn. On development of the lower cavity, to a size in excess of 5,000 cubic feet, the portion of the casing located above the interface of the upper KCl-containing deposit and the intervening sodium chloride-rich deposit is made porous by breaking through the hole casing at point 9 and allowing the water to pass through the casing wall into the deposit at this point.

The rate of water flow to the upper deposit can be small as compared to that going into the lower deposit or all of the water can be first fed to the upper cavity. Furthermore, the rate of dissolution of salt in the upper deposit will normally be insufficient to saturate the water with KCl, and in most cases the solution is also unsaturated with respect to NaCl. As a result, cavity 10 will be formed.

Breakage of the casing at the upper KCl-rich stratum may be achieved by well known techniques, such as, bullet or jet perforating systems or mechanically cutting the casing.

In the development of this upper cavity 10, oil will be charged thereto. As a result of this, horizontal expansion of the upper cavity results, typically concurrently with the horizontal expansion of the lower cavity when oil is similarly charged thereto. Of course, if vertical expansion is desired in the upper cavity, then water-immiscible liquid fluid is not added or the amount is reduced.

Expansion of the upper cavity by extraction of salts therefrom with water will typically dissolve KCl and NaCl in the solution in the range of from 10 to 95 percent by weight of the saturation point of these salts in water under the temperature conditions prevailing in the cavity.

According to a preferred embodiment of the invention, it is desired to effect extraction of potassium chloride through a pair of cased bore holes. Thus, it is more desirable to conduct the extraction by feeding water or a partially unsaturated aqueous solution down one hole and withdrawing the resulting KCl-sodium chloride solution from the pool of solution in the cavity through another hole. This is accomplished as diagrammatically illustrated in FIGURE 4. As shown therein, two holes, 11 and 21, are drilled and developed by the methods described above to communicate with the cavity in the lower potassium chloride-rich deposit. As described in Patent No. 3,096,969, a communicating cavity between holes 11 and 21 is developed in the NaCl-rich deposit below the lower KCl-rich deposit. Thus, extraction of sodium chloride solution from this sodium chloride-rich deposit continues from one or from both of the holes until the cavity 8 has been caused to expand laterally to the point where it is in communication with both holes. The level of the cavity is then allowed to rise through the sodium chloride-rich–potassium chloride-lean deposit until it reaches the potassium chloride-rich deposit. There is thus established a cavity 8 as diagrammatically shown in FIGURE 4. This cavity has a thin layer of the inert, immiscible fluid 6 comparable in character to the layers described in connection with FIGURES 1, 2 and 3.

Once extraction of the KCl-rich deposit is started, breakage of the casing of hole 11 is effected at point 9 in the upper KCl-containing deposit. Water is mechanically introduced thereby extracting both the upper and the lower KCl deposits, and the solution is withdrawn through hole 21. Typically, the solution, that is, potassium chloride-sodium chloride solution, is withdrawn from hole 21, usually from a level below that at which water is introduced through cased hole 11 to the lower KCl-rich deposit and often at or near the bottom of cavity 8 but above the level where crystals or insoluble impurities have accumulated to an appreciable degree. Alternatively, a solution of sodium chloride and potassium chloride, which is unsaturated as to both sodium chloride and potassium chloride, may be fed down the hole. In any event, whether water or a sodium chloride-potassium chloride solution is fed down hole 11 to contact both KCl deposits, care generally is taken to extract both sodium chloride and potassium chloride substantially in the proportion that they exist in both deposits.

FIGURE 5 shows an additional embodiment for developing and expanding of the upper cavity which involves plugging the incoming cased bore hole to water flow at a point adjacent the upper potassium chloride-rich stratum. This may be achieved by perforating the incoming hole 11 at the level of the upper KCl-rich deposit and feeding water to the hole thereby causing extraction in this upper deposit, as discussed above. After extraction of the upper deposit has proceeded to the formation of a cavity 10 having a size typically greater than 2 inches from the cased bore hole, a plug 14 may be inserted in the cased hole below the highest perforations and above the lowest perforations previously described, preferably in the middle of the perforated section 9 of the hole. As a result, water is diverted from flowing down the hole and by-passing the cavity 10 in the upper potassium chloride-rich deposit. The plug 14 serves to divert essentially all the incoming water through the perforations above the plug to cause circulation in the upper cavity. The water is removed from the cavity as an aqueous solution of NaCl and KCl through the perforations located below the diverting plug. As a result, water will be re-introduced into the bore hole 11 at a point located below the plug for extraction in the lower cavity.

Oil may be added with the water fully diverted to the upper cavity. Due to its lower density with respect to the density of water, it will be substantially contained within the cavity developed in the upper potassium chloride-rich deposit. Oil may be fed to the lower deposit by inserting a pipe 12 through the incoming bore hole 11 and the plug 14 so that it openly terminates at a point below the perforations in the hole. Oil or an oil and water mixture may be introduced through this pipe to provide said oil in the lower potassium chloride-rich deposit. Alternatively, the oil may be introduced through the outgoing hole 21 by reversing the flow from the outgoing hole to the normally incoming hole for a period of time sufficient for the oil addition to reach the lower cavity.

As illustrated by FIGURE 5, mining of the cavity 10 in the upper KCl-containing deposit can bring it into contact with hole 21. It is then possible to cause a breakage in hole 21 to effect extraction of this cavity at section 19. On the other hand, if the cavity in the upper KCl-containing deposit becomes too large for simultaneous extraction of both cavities, it is advisable to sink another hole 31 into the upper KCl-rich deposit and remove the solution developed in that deposit through the new hole. In this situation, it is often preferable to provide an inlet hole for each cavity as illustrated by FIGURE 6 and eliminate concurrent extraction of both cavities through a single inlet hole.

Although the present invention has been described with reference to specific details of certain embodiments thereof, it is not intended that such details should be regarded as limitations upon the scope of the invention except insofar as they are included in the accompanying claims.

We claim:

1. A method of mining potassium chloride which comprises feeding water into a subterranean potassium chloride-rich deposit, dissolving potassium chloride from the deposit to form a cavity therein, withdrawing an aqueous solution of potassium chloride from the cavity before it becomes saturated, forwarding the partially saturated solution to an existing developed cavity in a potassium chloride-rich deposit and therein dissolving further potassium chloride thereby forming a more concentrated solution.

2. The method of claim 1 wherein the water is fed to the lower part of the potassium chloride-rich deposit, a cavity is developed therein and the cavity is extended horizontally until it interconnects with an existing developed cavity in the same potassium chloride-rich deposit thereby forming an interconnected pair of cavities.

3. The method of claim 1 wherein the water is fed to the lower part of the potassium chloride-rich deposit, a cavity is developed therein and the cavity is extended horizontally until it interconnects with at least one cavity similarly in the process of being developed.

4. A method of mining potassium chloride from a subterranean deposit containing at least 15 per cent potassium chloride by weight, basis the weight of sodium chloride and potassium chloride in the deposit, which comprises drilling a hole into the potassium chloride-rich deposit, feeding water through the hole into the deposit, dissolving potassium chloride from the deposit to form a cavity therein, withdrawing from the cavity unsaturated aqueous solution ranging from 20 to 85 percent saturated with respect to the salt which more nearly saturates the solution, forwarding the partially saturated solution to an existing developed cavity in a potassium chloride-rich deposit to dissolve further potassium chloride, thereby forming a more concentrated solution and continuing to feed water to the first cavity and to withdraw partially saturated solution therefrom until the first cavity is developed to at least about 25 feet in diameter.

5. The method of claim 4 wherein the unsaturated solution is withdrawn from the new cavity up a pipe and is fed through pipes to the existing developed cavity.

6. The method claim 4 wherein the unsaturated solution obtained from a new cavity is forwarded to a plurality of new cavities.

7. The method of claim 4 wherein the new cavity is located in a potassium chloride-rich deposit other than the one in which the existing developed cavity is located.

8. The method of claim 4 wherein the unsaturated solution is passed from the cavity being developed to the existing developed cavity through a fracture which is induced along the interface at the bottom of the potassium chloride-rich deposit.

9. The process for recovering potassium chloride from a subterranean formation wherein two deposits containing potassium chloride are separated by an intervening sodium chloride-rich deposit lean in potassium chloride which comprises feeding water to the upper deposit to dissolve potassium chloride from said deposit thereby forming a cavity therein, the rate of feed of said water being sufficient that an aqueous solution of potassium chloride is withdrawn from the cavity before it becomes saturated, forwarding the partially saturated solution to the lower potassium chloride-rich deposit and dissolving further potassium chloride thereby forming a more concentrated solution.

10. The method of recovering potassium chloride from subterranean deposits containing (1) a potassium chloride-containing deposit having a potassium chloride content in excess of 15 percent by weight of the weight of KCl and NaCl in said deposit, (2) a potassium chloride-rich deposit having a potassium chloride content in excess of 15 percent by weight of the KCl and NaCl in said KCl-rich deposit, and wherein (1) and (2) are separated by a sodium chloride-rich–potassium chloride-lean deposit, which comprises placing a hole through (1) and (2) so that (1) and (2) are thereby openly connected, feeding water to (1) to dissolve potassium chloride therefrom to form a cavity therein, the rate of feed of said water being sufficient that an aqueous solution of potassium chloride is withdrawn from the cavity in (1) before it becomes saturated, forwarding the partially saturated solution from the cavity in (1) through the hole to (2), dissolving further potassium chloride from (2) thereby forming a more concentrated solution, and withdrawing the thus enriched solution from (2).

11. The method of claim 10 wherein a water-insoluble inert fluid having a density less than water is introduced with the water introduced to the hole.

12. The method of claim 10 wherein a cavity is first formed below (2) and water extraction of this cavity effected to make contact with (2) prior to feeding water to (1).

13. The process of claim 11 wherein said water insoluble fluid is separately introduced to deposit (1) and to deposit (2).

14. The method of recovering potassium chloride from subterranean formations containing (A) a potassium chloride-containing stratum having a potassium chloride content in excess of 15 percent by weight of the potassium chloride and sodium chloride in said stratum, (B) a sodium chloride-rich stratum disposed below (A) in said formation and having a potassium chloride content less than 15 percent by weight of the potassium chloride and sodium chloride in said sodium chloride-rich stratum, and (C) a potassium chloride-rich stratum disposed below (B) in said formation and having a potassium chloride content in excess of 15 percent by weight of the potassium chloride and sodium chloride in said potassium chloride-rich stratum, which comprises drilling a hole through (A), (B) and (C), fitting a casing within said hole, feeding water to said hole to extract (C), thereby developing a cavity in (C), perforating the casing adjacent (A), plugging the casing below the highest of said perforations and above the lowest of said perforations, feeding water to the cased hole at sufficient rate so that the water passes through the perforations above the plug into (A), dissolves (A) thereby developing a cavity therein, and passes as an unsaturated aqueous solution of potassium chloride through the perforations located below the plug into the cased hole and down to the cavity in (C), to extract (C), and withdrawing potassium chloride solution from the cavity in (C).

15. The method of claim 14 wherein a pipe is inserted through the cased bore hole and the plug so as to openly terminate below the perforations in the casing, and a water-immiscible fluid is introduced through said pipe to form a protective layer at the upper portion of the cavity in (C).

References Cited by the Examiner

UNITED STATES PATENTS

| | | | |
|---|---|---|---|
| 2,685,438 | 8/1954 | Cross | 299—5 |
| 2,850,270 | 9/1958 | Hanson | 299—4 |
| 2,861,428 | 11/1958 | Hendrix | 299—5 |
| 2,880,587 | 4/1959 | Hendrix et al. | 299—5 X |
| 2,952,449 | 9/1960 | Bays | 299—4 |
| 3,022,986 | 2/1962 | Brandt | 299—5 |
| 3,096,969 | 7/1963 | Edmonds et al. | 299—4 |

ERNEST R. PURSER, *Primary Examiner.*

CHARLES E. O'CONNELL, *Examiner.*